Sept. 4, 1956   J. W. DUHAMEL   2,761,740
SYSTEM FOR ELEVATING CONTACT MATERIAL
Filed Dec. 10, 1952

INVENTOR.
JAY W. DUHAMEL
BY
Robert O. Spurdle
ATTORNEY

United States Patent Office 2,761,740
Patented Sept. 4, 1956

2,761,740

SYSTEM FOR ELEVATING CONTACT MATERIAL

Jay W. Duhamel, Toledo, Ohio, assignor to Sun Oil Company, Philadelphia, Pa., a corporation of New Jersey Application December 10, 1952, Serial No. 325,157

7 Claims. (Cl. 302—53)

This invention relates to apparatus for elevating or lifting pneumatically granular or pelleted contact material or catalyst from a lower chamber which receives the material in a continuous stream upwardly into and through an elongate conduit to an upper chamber. In particular the invention is directed to apparatus for supplying an elevating medium to the material in the lower chamber in order to convey it therefrom to and through the elongate conduit in such a manner as to reduce attrition of the material particles or pellets to a minimum during its passage to the upper chamber.

It is well known in the art of catalysis, such as the cracking of heavier petroleum fractions to gasoline and other hydrocarbon processing operations, to use catalyst or contact material in a continuous system. In such continuous systems a conversion zone is operated simultaneously with a second zone which is in regeneration. Most commercial moving or continuous catalyst systems have the conversion zone and regeneration zone in superposed relationship with the conversion zone usually above the regeneration zone so that the catalyst or contact material moves through the conversion zone to the regeneration zone by gravity and after regeneration the material is carried upwardly and returned to the conversion zone to repeat the cycle of operation. To return the catalyst or contact material from the lower regeneration zone to the upper conversion zone two well known means applicable to the transportation of granular solids from one locus to another have been used, namely, by mechanical conveyors and by pneumatic conveyors, in the latter of which air, steam or flue gas produced at the refinery is readily available as the pneumatic lifting medium.

It is necessary in systems employing conversion and regeneration zones in superposed relationship to convey the catalyst or contact material which is usually in pelleted or granular form through a conduit several hundred feet in length in order to return it from the lower reaction zone to the upper reaction zone. From the lower reaction zone the material is delivered by gravity to a chamber positioned at a level below that of the lower reaction zone, from which chamber it is necessary to effect or begin the lifting or upward conveying operation. In a pneumatic lifting system this lowermost chamber is generally known in the art as an engager since the material is engaged therein by the lifting flue gas or air to effect the lifting operation. The lower end of the air lift conduit extends into or is in communication with the engager while the upper end of the lift conduit communicates with an upper chamber positioned at a level above the top of the upper reaction zone. The upper chamber is designed so that the lifting medium is separated from the catalyst or contact material and is generally known as the disengager.

The present invention is directed to the engager portion of a continuous catalyst system and in particular to novel apparatus for maintaining the material within the engager in a state of agitation or turbulence in order that it can be readily conveyed upwardly through the elevating conduit to the disengager.

A complete understanding of the present invention may be had by reference to the following description taken in connection with the accompanying drawings which form a part of the application in which.

Figure 1:
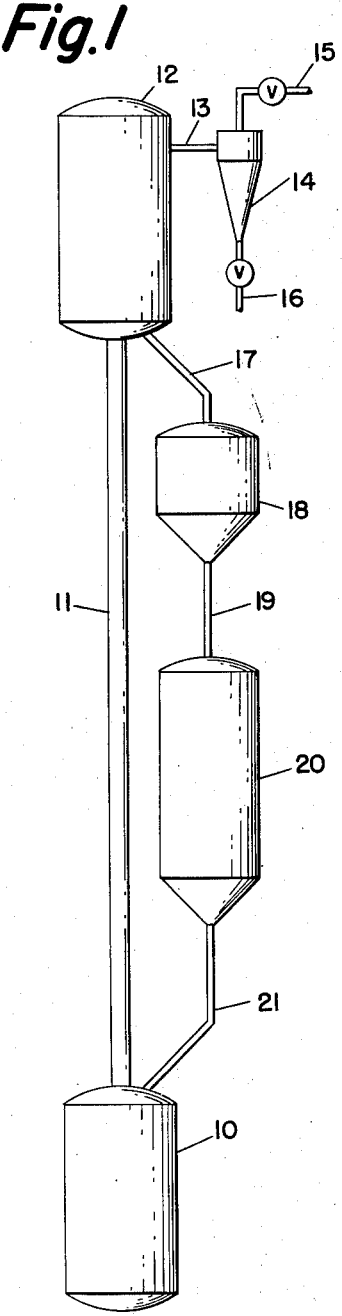
Figure 1 is an elevational view for schematically showing a typical catalytic cracking system employing a pneumatic lift for elevating pelleted catalyst or contact material.

Referring to Figure 1 of the drawing, which shows diagrammatically the conventional elements of a continuous system, a lower receptacle or chamber 10 functions as a catalyst engager, wherein the catalyst is engaged by the air, flue gas or steam supplied thereto by suitable means not shown. The lift pipe or elevating conduit is indicated at 11 and has its lower end communicating with the chamber 10 and its upper end communicating with an upper chamber 12 which is the disengager wherein the material is disengaged from the air or other elevating medium. The lifting medium is discharged from the upper chamber 12 through a conduit 13 and is passed to any conventional separating means such as a cyclone separator 14 having an upper conduit 15 in communication therewith to remove the lifting medium and a lower conduit 16 for removing any fines which are entrained in the lifting medium.

The catalyst which remains in the disengager 12 is returned through conduit 17 by gravity to an upper reaction zone 18 wherein usually an on-stream reaction is effected to obtain the desired product and continues to flow therefrom through conduit 19 by gravity into a lower reaction zone 20 wherein the catalyst or contact material is regenerated to remove therefrom any deposits which have been formed in the upper chamber 18. From the lower chamber 20 the catalyst or contact material continues to flow by gravity through conduit 21 and is returned to the engaging chamber 10. The conduits 17, 19, and 21 through which the catalyst or contact material flows in returning from the disengager 12 to the engager 10 are usually provided with means for supplying steam or other gaseous purging medium thereto in order to prevent reaction products formed in chamber 18 and regeneration fumes formed in chamber 20 from communicating with the other chambers in the unit.

Figure 2:
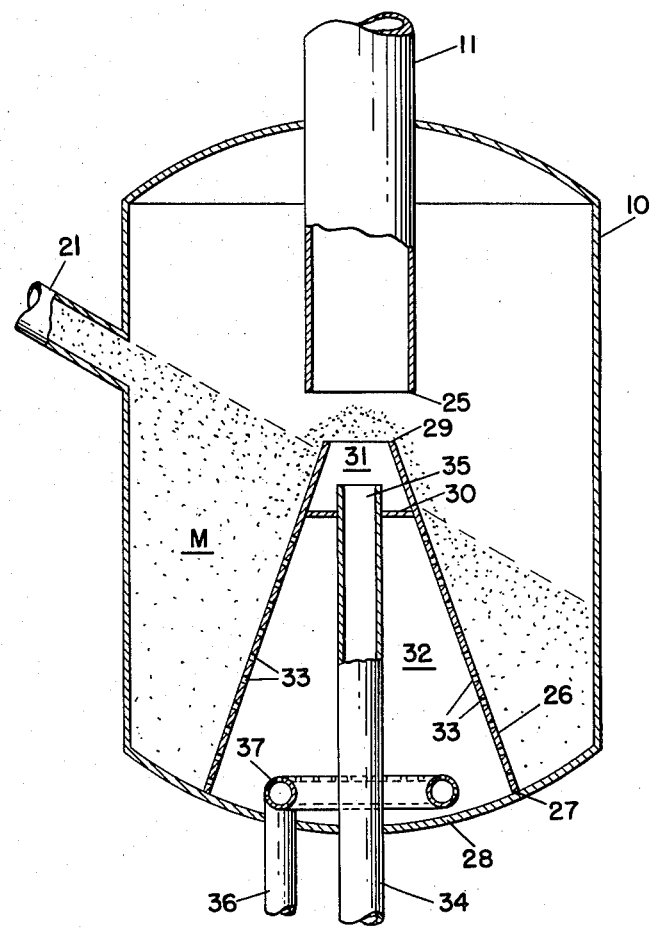
Figure 2 is an enlarged view in sectional elevation showing the invention as applied to the engager portion of the system.

Referring to Figure 2, the engager 10 receives the catalyst or contact material by the supply conduit 21 which communicates therewith through its sidewall and the material M will acquire an angle of repose as indicated generally by the dashed line. It will be understood that the supply conduit may communicate with the engager 10 through the top in which case the material will acquire an angle of repose generally in the shape of a cone. The elevating conduit 11 has its lower end portion extending into the engager so that its open end 25 is disposed somewhat above the level of the mass of contact material M.

The arrangement for moving the contact material from the mass M into the elevating conduit 11 for conveyance upwardly to the disengager 12 comprises principally a frustoconical fluid distribution member 26. This member has its lower open enlarged end 27 secured to the bottom wall 25 of the engager and its upper open restricted end 29 disposed below and adjacent the lower open end 25 of the elevating conduit. The fluid distributing member 26 is provided with a partition 30 below its upper open end 29 dividing the member into an upper nozzle section 31 and a lower section 32. The lower section 32 is provided with apertures 33 which are disposed about its general area.

Independent streams of elevating fluid are supplied to each section of the fluid distributing member 26. To this end a fluid supply conduit 34 has its upper open end 35 extending through the partition 30 and positioned somewhat below the upper open end 29 of the fluid distribution member 26. The upper open end forms a fluid nozzle which is in close proximity to the lower inlet end of the elevating conduit. A separate fluid supply means is provided for the lower section 32 of the fluid distribution member and comprises a conduit 36 having a ring manifold 37 positioned within the lower section 32 and preferably about the conduit 34.

The elevating fluid is supplied simultaneously to the conduits 34 and 36 and the fluid upon entering the mass M through the apertures 33 of lower section 32 will function to maintain the particles in a state of agitation and carry the particles upwardly toward the lower end 25 of the elevating conduit while the fluid from conduit 34 will pass through the nozzle 31 and pick up the particles. The particles will then enter the elevating conduit as a stream and be conveyed to the disengager 12 at the desired velocity in order to reduce attrition to a minimum.

It should be understood that the present invention is not directed to usual pneumatic conveying apparatus but is concerned with the continuous movement of catalyst or contact material from the engager 10 to the disengager 12 in such a manner that the material is elevated with the smallest degree of frictional contact of the material with itself or with the elevating apparatus.

The invention claimed is:

1. Apparatus for elevating granular material from a lower chamber containing a body of the material to an upper chamber which comprises an upright elevating conduit having its lower open end extending through the top of said lower chamber to be positioned above the level of the body of material and its upper open end extending into the upper chamber, a fluid distribution member within the lower chamber and having an upper surface which is inclined upwardly toward the axis of the elevating conduit, means dividing the distribution member into independent fluid compartments, a plurality of apertures in one compartment, means for supplying fluid to said one compartment for diffusion upwardly through the body of material and other means for supplying fluid to the other compartment for conveying the material upwardly through the elevating conduit and into the upper chamber.

2. Apparatus for elevating granular material from a lower chamber containing a body of the material to an upper chamber which comprises an upright elevating conduit having its lower open end extending through the top of said lower chamber to be positioned above the level of the body of material and its upper end extending into the upper chamber, a vertically disposed fluid distribution member within the lower chamber extending through the body of material and having an inclined upper surface, a parition extending laterally across the distribution member dividing it into upper and lower fluid compartments, a plurality of apertures in the lower compartment, means for supplying a fluid to said lower compartment for diffusion upwardly through the body of material, and other means for supplying fluid to the upper compartment for conveying the material upwardly through the elevating conduit and into the upper chamber.

3. Apparatus for elevating granular material from a lower chamber containing a body of the material to an upper chamber which comprises an upright elevating conduit having its lower open end extending through the top of said lower chamber to be positioned above the level of the body of material and its upper end extending into the upper chamber, a fluid distribution member within the lower chamber extending through the body of material and having an inclined upper surface and having its upper open end positioned above the level of the body of material and adjacent the lower open end of the elevating conduit, a partition across the distribution member dividing it into upper and lower fluid compartments, a plurality of apertures in the lower compartment, means for supplying a diffusion fluid to said lower compartment for passage upwardly through the body of material, and other means for supplying an elevating fluid to the upper compartment for conveying the material upwardly through the elevating conduit and into the upper chamber.

4. Apparatus for elevating granular material from a lower chamber containing a body of the material to an upper chamber which comprises an upright elevating conduit having its lower open end extending through the top of said lower chamber to be positioned in a space above the level of the body of material and its upper end extending into the upper chamber, a fluid distribution member within the lower chamber extending vertically through the body of material and having an inclined upper surface, said distribution member having its upper open end positioned in the space above the body of material and below and adjacent to the lower open end of the elevating conduit, a partition across the distribution member dividing it into upper and lower fluid compartments, a plurality of apertures in the lower compartment, means for supplying a diffusion fluid to said lower compartment for passage upwardly through the body of material, and other means for supplying an elevating fluid to the upper compartment for conveying the material upwardly through the elevating conduit and into the upper chamber.

5. Apparatus according to claim 1 wherein said fluid distribution member is a frustoconical member.

6. Apparatus for elevating granular material from a lower chamber containing a body of the material to an upper chamber which comprises an upright elevating conduit having its lower open end extending through the top of said lower chamber and its upper open end extending into the upper chamber, a fluid distribution member within the lower chamber and having an upper surface which is inclined upwardly toward the axis of the elevating conduit, said member having a plurality of apertures in said upper surface, means for supplying fluid to the interior of said member for passage through said apertures into said body of the material, and other means for supplying fluid at a level above said apertures to convey the material upwardly through the elevating conduit and into the upper chamber.

7. Apparatus for elevating granular material from a lower chamber containing a body of the material to an upper chamber which comprises an upright elevating conduit having its lower open end extending through the top of said lower chamber and its upper open end extending into the upper chamber, a vertically elongated fluid distribution member within the lower chamber, said member having a sidewall which is inclined upwardly toward the axis of the elevating conduit, and having in said sidewall a plurality of apertures vertically spaced apart, means for supplying fluid to the interior of said member for passage through said apertures into said body of the material, and other means for supplying fluid at a level above said apertures to convey the material upwardly through the elevating conduit and into the upper chamber.

References Cited in the file of this patent

UNITED STATES PATENTS

| 2,509,984 | Morrow | May 30, 1950 |
| 2,587,669 | Weinrich | Mar. 4, 1952 |
| 2,662,796 | Shabaker | Dec. 15, 1953 |